United States Patent
Gould

(10) Patent No.: US 12,322,081 B2
(45) Date of Patent: Jun. 3, 2025

(54) VEHICLE IMAGING STATION

(71) Applicant: Degould Limited, Exeter (GB)

(72) Inventor: Daniel George Gould, Exeter (GB)

(73) Assignee: DEGOULD LIMITED, Exeter (GB)

( * ) Notice: Subject to any disclaimer, the term of this patent is extended or adjusted under 35 U.S.C. 154(b) by 365 days.

(21) Appl. No.: 17/772,441

(22) PCT Filed: Sep. 22, 2020

(86) PCT No.: PCT/GB2020/052289
§ 371 (c)(1),
(2) Date: Apr. 27, 2022

(87) PCT Pub. No.: WO2021/084224
PCT Pub. Date: May 6, 2021

(65) Prior Publication Data
US 2022/0375064 A1    Nov. 24, 2022

(30) Foreign Application Priority Data

Oct. 28, 2019  (GB) ..................... 1915612

(51) Int. Cl.
*G06T 7/00* (2017.01)
*G06V 10/22* (2022.01)
(Continued)

(52) U.S. Cl.
CPC .......... *G06T 7/0004* (2013.01); *G06V 10/225* (2022.01); *G06V 20/54* (2022.01);
(Continued)

(58) Field of Classification Search
CPC ......... G06T 7/0004; G06T 2207/10024; G06T 2207/30156; G06V 10/225; G06V 20/54; H04N 7/181
See application file for complete search history.

(56) References Cited

U.S. PATENT DOCUMENTS

2016/0034590 A1*  2/2016  Endras ................... G06Q 30/08
                                                        707/770
2016/0100087 A1*  4/2016  Scheich ............... G06T 1/0007
                                                        348/47
(Continued)

FOREIGN PATENT DOCUMENTS

| EP | 1710566 A3 | 12/2007 |
| JP | 2007 285983 A1 | 11/2007 |
| JP | 6 264 132 B2 | 1/2018 |

OTHER PUBLICATIONS (PCT) International Search Report and Written Opinion issued by the European Patent Office acting as International Searching Authority for International Patent Application No. PCT/GB2020/052289 dated Nov. 16, 2020 (14 total pages).
(Continued)

*Primary Examiner* — John R Wallace
(74) *Attorney, Agent, or Firm* — Thompson Hine LLP

(57) ABSTRACT

A vehicle imaging station for capturing images of scratches on a vehicle, the vehicle imaging station including a tunnel having an entrance and an exit, with one or more walls defining an enclosure between the entrance and exit to define a tunnel volume containing a vehicle pathway having a central axis. The station further includes a reflection source surface and a camera arranged with a field of view including an imaging volume of the tunnel volume in which an image defined by the reflection source surface will be reflected to be visible to the camera as a reflected image by a vehicle moving along the vehicle pathway. The station also includes a color modifier arranged to cause the reflection source surface to adopt a first color of a plurality of possible colors in response to a color control signal such that the reflected image has the first color.

15 Claims, 3 Drawing Sheets

(51) Int. Cl.
*G06V 20/54* (2022.01)
*H04N 7/18* (2006.01)

(52) U.S. Cl.
CPC ... *H04N 7/181* (2013.01); *G06T 2207/10024* (2013.01); *G06T 2207/30156* (2013.01)

(56) References Cited

U.S. PATENT DOCUMENTS

2018/0012350 A1   1/2018  Gangitano
2018/0165541 A1   6/2018  Amico et al.
2019/0096057 A1   3/2019  Allen
2019/0346745 A1* 11/2019  Tindall ................... G03B 15/06

OTHER PUBLICATIONS (GB) Combined Search and Examination Report issued by the UK Intellectual Property Office for GB Patent Application No. GB1915612.4 dated Dec. 20, 2019 (6 total pages).
European Patent Office, Examination Report issued Jun. 15, 2023 which pertains to EP Patent Application No. 20780322.2. 7 pgs.

* cited by examiner

VEHICLE IMAGING STATION

This application is a national stage filing of International Application No. PCT/GB2020/052289 filed on Sep. 22, 2020 (corresponding to Publication No. WO 2021/084224), which in turn claims priority to GB 1915612.4 filed on Oct. 28, 2019. The entire contents of both of these applications are hereby incorporated by reference.

FIELD

This application relates to a vehicle imaging station, and more particularly to a vehicle imaging station for identifying scratches and/or dents on a vehicle.

BACKGROUND

Over time, a vehicle may suffer external damage including scratches.

Vehicle imaging stations are known which use digital cameras to capture images of a vehicle to identify scratches on the vehicle.

The present inventor has devised an improved vehicle imaging station that can detect scratches on a vehicle more accurately in comparison to known vehicle imaging stations.

SUMMARY

In accordance with a first aspect of the present invention, there is provided a vehicle imaging station for capturing images of scratches on a vehicle. The vehicle imaging station can comprise a tunnel having an entrance and an exit, with one or more walls defining an enclosure between the entrance and exit to define a tunnel volume containing a vehicle pathway having a central axis. The vehicle imaging station can comprise a reflection source surface. The vehicle imaging station can comprise a camera arranged with a field of view comprising, containing and/or encompassing an imaging volume of the tunnel volume in which an image defined by the reflection source surface will be reflected to be visible to the camera by a vehicle moving along the vehicle pathway. Put another way, the vehicle imaging station can comprise a camera arranged with a field of view comprising, containing and/or encompassing a first portion of the tunnel volume in which an image of the reflection source surface will be detectable when a vehicle is moving along the vehicle pathway. The vehicle imaging station can comprise a color modifier arranged to cause the reflection source surface to adopt a first color of a plurality of possible colors in response to a color control signal such that the reflected image has the first color. Put another way, the vehicle imaging station can comprise a color modifier arranged to cause the reflection source surface to adopt a first color of a plurality of possible colors in response to a color control signal such that the reflection source surface projects the first color into the tunnel volume and the image detected by the camera has the first color.

Thus, the vehicle imaging station of the first aspect has a camera which sees a reflection of a particular color when a vehicle passes through the tunnel. The present inventor has found that a vehicle imaging station according to the first aspect of the invention enables the detection of scratches on a vehicle with a high degree of accuracy. Depending on the color of the vehicle and/or the color and/or depth of a scratch, the scratch is likely to be more visible when the color modifier causes the reflection source surface to have one color rather than another. As such, by providing a color modifier that can be used to change the color of the reflection panel in response to the color of the vehicle and/or the color and/or depth of a scratch, the vehicle imaging station according to the first aspect can detect scratches on a vehicle more accurately in comparison to known vehicle imaging stations.

The imaging station can comprise a data processor or controller such as a general purpose computer, application specific integrated circuit or the like, optionally arranged to receive inputs from the cameras and store them in computer memory and/or transmit them to a remote device.

The imaging station can comprise one or more sensors coupled to the controller. The imaging station can for example comprise: a sound transducer such as a microphone arranged to detect engine noise; a proximity sensor arranged to detect a vehicle approaching the opening; and/or a vehicle speed sensor that the controller can use to synchronize cameras for stitching images together to form a continuous image of some or all of the vehicle or for adjusting camera settings such as shutter speed. The controller can be configured to stitch images from a or the camera together to form a continuous image of some or all of the vehicle.

The controller can trigger the camera. The controller can trigger the camera in response to criteria such as a confirmation signal that the color modifier has caused the reflection source surface to adopt the first color. The confirmation signal can for example be provided by the color modifier, input from one or more sensors and/or temporal conditions having been met.

The controller can trigger the vehicle color input signal. The controller can be arranged to generate and transmit the color control signal to the color modifier in response to vehicle information.

The vehicle information can comprise pre-existing knowledge of the color(s) of a vehicle, and optionally any pre-existing scratch damage, that can for example be accessed in response to number plate recognition or any other suitable vehicle identifier.

The vehicle information can comprise color information detected by the camera or one or more further cameras.

The reflection source surface can comprise an illuminating surface such as a lightbox. In such embodiments, the color modifier can comprise a light source arranged to project light through the reflection source surface. The reflection source surface can therefore be defined by a translucent panel of the light box, which scatters light as it is transmitted through the reflection source surface.

The reflection source surface can comprise a non-illuminating surface. The non-illuminating surface can be any surface that is not a light source. In such embodiments, the color modifier can comprise a light source arranged to project light onto the reflection source surface without the light passing through the reflection source surface from behind the reflection source surface.

The reflection source surface can comprise a non-reflective surface. The present inventor has found that when the reflection source surface is a non-reflective surface, scratches may be more clearly visible. The non-reflective surface can be any surface that scatters more light than it reflects.

The reflection source surface can comprise a plain surface for example a substantially non-patterned surface. This can provide a blank or non-patterned reflection image to the camera in which scratches on the vehicle are easily visible.

The reflection source surface can comprise a planar or flat portion.

The reflection source surface can comprise a curved or arc shaped portion.

The imaging station can comprise a plurality of distinct reflection source surfaces each with a color modifier as defined above. This can enable the system to more accurately detect different color scratches on a vehicle of a single color, or scratches on different colored parts of the same vehicle.

One or more further cameras can be provided each arranged with a field of view comprising, containing and/or encompassing an imaging volume of the tunnel volume in which an image defined by one of the reflection source surfaces will be reflected to be visible to the camera by a vehicle moving along the vehicle pathway.

A light source can be provided which is distinct from the color modifier, and arranged to direct light within the tunnel.

The side walls and roof can be generally planar or flat, with the roof extending orthogonally to the side walls to create a rectangular cross section tunnel. Alternatively, the tunnel can have an arc shaped or otherwise curved cross section.

The ends of the side wall(s) can define the opening and exit i.e. the opening and exit can have roughly the same cross sectional area as other portions of the tunnel.

The ends of the side wall(s) can extend inwardly towards one another to define angled end wall portions which define the entrance and exit. This arrangement can enable the middle portion of the tunnel to have a relatively large cross sectional area for containing equipment, while the area of the entrance and exit is each relatively small to control the amount of light that can enter the tunnel.

Where angled end wall portions are provided, a light source such as the color modifier can be mounted on or adjacent the internal surface(s) of the angled end wall portions. This can reduce the likelihood of a driver of the vehicle seeing the light image as the vehicle enters the tunnel.

The entrance can be distinct from the exit, resulting in a linear vehicle pathway between the entrance and exit. The entrance and exit can be aligned. The linear pathway can be a straight line for ease of passage.

The imaging station can comprise one or more further cameras arranged to capture images of the front and/or rear of the vehicle, the underbody and/or the wheels or tires. This can enable the number plate to be captured by the system and/or the condition of wheels, tires and the underbody to be recorded.

The controller can execute a program to perform color matching to adjust camera settings for vehicle color.

BRIEF DESCRIPTION OF THE DRAWINGS

By way of example only, certain embodiments of the invention will now be described by reference to the accompanying drawings, in which.

DETAILED DESCRIPTION

Figure 1A:
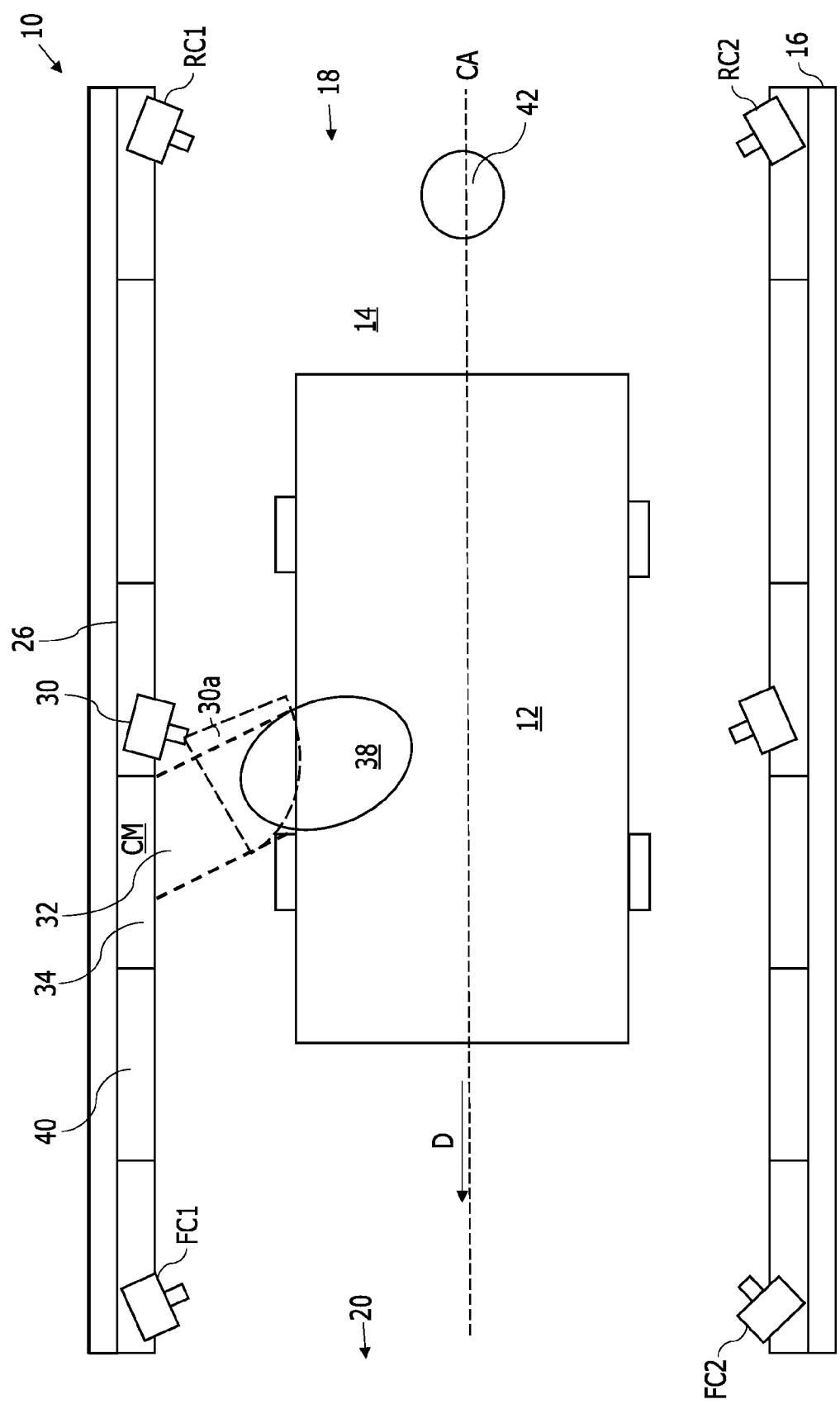
FIG. 1A is a diagram illustrating a vehicle imaging station according to an embodiment.
Figures 1B, 1C:
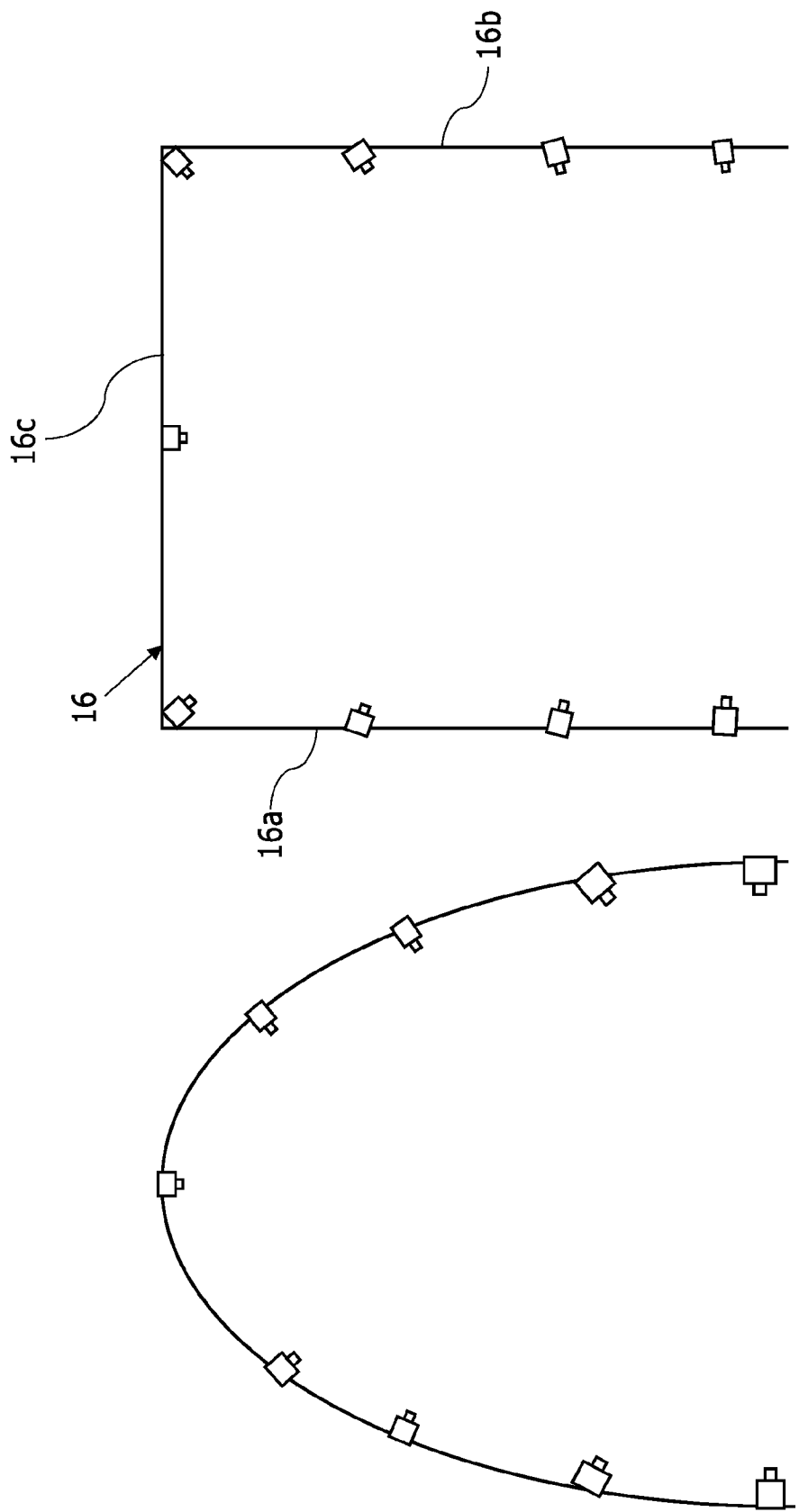
FIG. 1B is a diagram illustrating the cross sectional profile of the tunnel of FIG. 1A.
FIG. 1C is a diagram illustrating an alternative tunnel cross section.

Referring to FIGS. 1A and 1B, a vehicle imaging station according to an embodiment is shown generally at 10. The vehicle imaging station 10 is arranged to take images of a vehicle 12 that can be used to identify damage in the form of scratches on outer panels or other surfaces of the vehicle.

The vehicle imaging station 10 is arranged around a vehicle pathway 14, which can be any path suitable for the vehicle 12 to travel along in a direction D. The pathway 14 is a straight, linear pathway in the illustrated embodiment, but in other embodiments can take any form.

The vehicle imaging station 10 comprises a tunnel 16 arranged so that the vehicle pathway 14 runs through it. In this embodiment the tunnel has two generally planar side wall sections 16a, 16b that are joined at the top by an orthogonally extending, generally planar roof 16c to form a single structure. However, in other embodiments the tunnel can have any suitable cross sectional shape, such as the arch shown in FIG. 1C to which reference should additionally be made.

The tunnel has an entrance 18 and an exit 20 via which the vehicle can enter and exit the tunnel. In this embodiment the entrance and exit are situated at opposite ends of the tunnel to define a linear vehicle pathway having a central axis CA. However, in other embodiments the tunnel can have any suitable shape and can have any number of entrances and/or exits, in some cases just a single opening that serves as both an entrance and an exit.

A camera 30 is arranged to image the vehicle 12 as it moves along the vehicle pathway 14.

The inventor has recognized that it can be difficult to see or detect scratches in images of a vehicle that have been captured by known vehicle imaging stations. The inventor has devised an improved arrangement that can detect scratches on a vehicle in a more accurate manner in comparison to known vehicle imaging stations.

The imaging station 10 includes a reflection source surface 34, which for brevity we will refer to as the target surface. The target surface 34 is arranged to be visible to the camera 30 when reflected via a vehicle 12 moving along the vehicle pathway. As such, the image of the vehicle that is captured by the camera will be influenced in appearance by the target surface in terms of color and brightness for example.

The target surface 34 can be any surface that is visible to the camera when reflected via a vehicle 12 moving along the vehicle pathway through the imaging volume 38. As will be appreciated, vehicles have different shapes and overall size. As well as this, individual vehicles have various vehicle panel shapes along the body of the vehicle. As such, the cameras will see a differing orientation of vehicle surface as the vehicle moves along the vehicle pathway. This can result in the reflected image 'moving' within the tunnel with changes in vehicle surface profile, meaning that the camera will see various parts of the target surface as the vehicle moves through the imaging volume. As the profiles of most vehicles are known and are to some extent generally similar, the camera, imaging volume and/or reflection source surface can therefore be arranged and configured to account for size and shape variation across multiple vehicles. Likewise, shifts in the reflected image due to the variation of surface panels on single vehicle can be accounted for.

For example, the imaging volume can be sized so that all vehicles will be able to pass through or if a specific vehicle shape is being imaged, the imaging volume could be optimized for that specific shape. An example of this would be arranging the target surface and camera at specific heights and orientations to optimize the reflection from specific panels of that single vehicle shape.

The target surface 34 can for example comprise a single panel or multiple discrete panels that cover the sidewall portions and optionally the roof of the tunnel. The target surface 34 can extend some or all of the way along the tunnel or alternatively comprise a plurality of discrete panels placed at strategic locations along the tunnel. Thus, cameras positioned at different locations around the tunnel will be able to see different parts of the target surface in reflection via different parts of the vehicle. The target surface 34 can be generally planar or flat, or alternatively can be curved or arched to match the shape of the tunnel.

The vehicle imaging station 10 also includes a color modifier CM. The color modifier CM is arranged to cause the target surface 34 to adopt a first color of a plurality of possible colors in response to a color control signal such that the reflected image has the first color. The first color can be selected from multiple possible colors dependent on the color of the vehicle to optimize the detection of scratches. The color modifier CM receives an input which instructs the color modifier CM to project a color so that the target surface 34 appears to have the chosen color. As described in more detail below, the color control signal can be generated by a controller system or can be manually generated by a user.

In the illustrated embodiment the target surface 34 is a plain, non-reflective, translucent surface such as a light box. The outer surface of the light box, which faces the portion 38 of the tunnel volume 14, defines the target surface 34. The color modifier CM includes a light source (not shown) which projects a first color through the translucent surface of the light box to cause the light box outer surface to appear to have the first color. The light source is capable of projecting a single color chosen from a plurality of possible colors.

In other embodiments the target surface 34 can be a plain, non-reflective, non-illuminating surface such as a non-patterned, matte surface. In such embodiments the color modifier can comprise a light source within the tunnel volume, such as on the roof, arranged to direct colored light onto the target surface 34 and thus cause the target surface 34 to appear to have the first color.

In any embodiment the color modifier can comprise any suitable color light source, such as color changing LED light bulbs or strips. In one example, the light source can be an RBG LED strip controlled via a digital multiplex signal (DMX) control.

Together, the target surface 34 and color modifier CM can enable scratches on the vehicle 12 to be more accurately imaged. For example, a red car having a white scratch can be more accurately imaged by using a red target surface 34. When the target surface 34 is red and thus matches the vehicle 12 color, the white scratch is more clearly visible than it would be if a white target surface 34 was used for example.

Multiple cameras 30 can be arranged inside the tunnel 16, located on the side walls 16a, 16b and roof 16c for example to form an arch, as shown in FIGS. 1B and 1C, so that the sides and roof of the vehicle 12 can be simultaneously imaged. Each camera has a field of view which includes a reflected image of the target surface via the vehicle.

Figure 2:
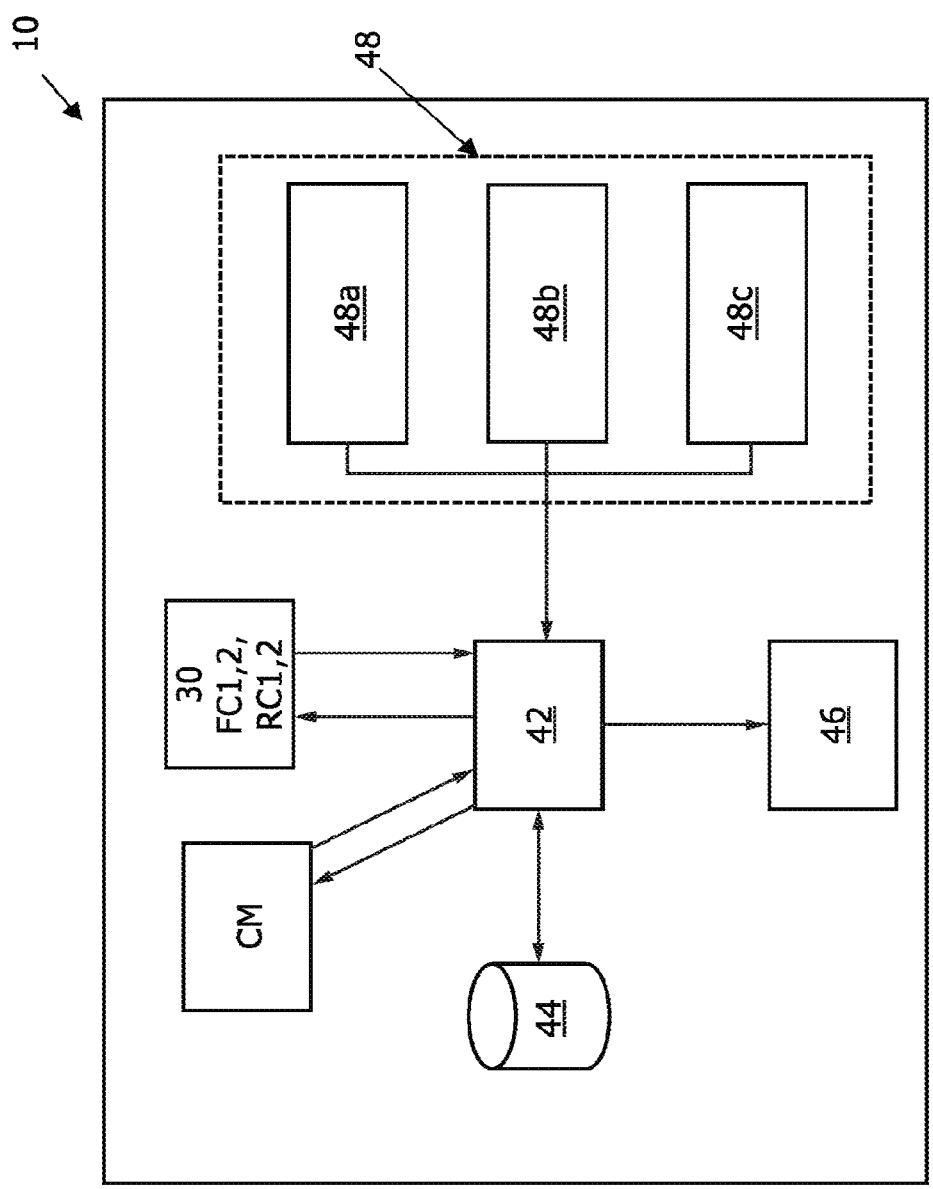
FIG. 2 is a system diagram of the controller of the imaging station of FIG. 1A.

Referring additionally to FIG. 2, the imaging station 10 is provided with a data processor or controller 42 such as a general purpose computer, application specific integrated circuit or the like, arranged to receive inputs from the cameras and store them in computer memory 44 and/or transmit them to a remote device 46.

Rear cameras RC1, RC2 can be provided at the entrance 18 of the tunnel and front cameras FC1, FC2 can be provided at the exit 20 of the tunnel 16 such that these cameras can capture images of the vehicle 12 as it enters and exits the tunnel volume.

The controller 42 can execute a program arranged to trigger the camera 30. The controller 42 can be arranged to trigger some or all of cameras 30, FC1, FC2, RC1, RC2, in response to criteria such as input from one or more sensors 48 and/or temporal conditions having been met.

The vehicle imaging station can comprise a unique identifier capture system for capturing and processing one or more images of unique identifiers associated with vehicle being imaged by the apparatus. The system can for example be arranged to capture the vehicle number plate or chassis number as the vehicle passes through the tunnel. The identification code can be detected by any one of the cameras in the tunnel volume or manually input prior to the vehicle entering the tunnel volume. In the illustrated embodiment one or both of the forward facing cameras FC1, FC2 are arranged to capture the vehicle number plate or chassis number. Alternatively, the vehicle number plate or chassis number can be captured by any suitable means, such as a dedicated camera near the imaging volume entrance 18 or manually input by a user.

Data regarding the vehicle ID is input to the controller 42, which can consult a publicly available vehicle color database stored in the memory 44. The vehicle color is retrieved from the database.

Alternatively, any one of the cameras or a dedicated camera can detect the vehicle color directly through imaging and analyzing the vehicle color. This information can be passed to the controller 42.

The controller 42 generates a signal to send to the color modifier CM to instruct the color modifier CM to project light of a specific color based on the color of the vehicle 12. For example, if the color control signal provided by the controller 42 contains the information that the vehicle is a red color, the color modifier CM can be instructed to produce a suitable color so that the target surface improves the detection of damage to the vehicle. The color modifier CM sends a return signal to the controller 42 to confirm that the first color is being projected. The controller 42 receives the confirmation input and generates a signal to instruct the camera 30 and optionally one or more of FC1, FC2, RC1, RC2 to begin imaging the vehicle.

Alternatively, the controller 42 can for example wait a predetermined time period after generating the color modifier signal to calculate when to instruct the cameras 30, FC1, FC2, RC1, RC2 to begin imaging the vehicle.

Alternatively, the color control signal instructing the color modifier CM to begin projecting a color can be generated manually. For example, a user can visually determine the vehicle color and select a suitable vehicle color input signal.

Images detected from the cameras 30, FC1, FC2, RC1, RC2 can either be stored in the memory 44 or transmitted to or via the remote device 46.

The imaging station 10 can also be provided with one or more sensors 48 coupled to the controller 42. The imaging station 10 can for example comprise: a sound transducer 48a such as a microphone arranged to detect engine noise; a proximity sensor 48b arranged to detect a vehicle approaching the opening; and/or a vehicle speed sensor 48c that the controller 42 can use to synchronize cameras for stitching images together to form a continuous image of some or all of the vehicle or for adjusting camera settings such as shutter speed.

The controller 42 can perform further color matching to adjust camera settings for vehicle color. Color matching can comprise sampling the vehicle color either in the tunnel or outside via a camera. The image is then processed to determine the color of the vehicle. Depending on the color of the vehicle, all of the cameras inside the tunnel can be optimized in terms of color contrast and brightness for imaging a vehicle of the color. The imaging station can therefore adjust the camera settings to allow for such variations in color.

An optional general light source 40 can be provided, such as a further light box, in order to provide a general light source for the tunnel 16. Increasing the amount of light within the tunnel 16 is advantageous as it can reduce noise on the cameras, meaning that the cameras can be fired at a faster rate. A plurality of general light sources can be provided within the tunnel to illuminate various sides of the vehicle. However, in one case any general light sources are not be directly visible to the cameras 30 when a vehicle is being imaged.

In any embodiment the ends of the side wall(s) can define the opening and exit i.e. the opening and exit can have roughly the same cross sectional area as other portions of the tunnel. Alternatively, the ends of the side wall(s) can extend inwardly towards one another to define angled end wall portions which define the entrance and exit. This arrangement can enable the middle portion of the tunnel to have a relatively large cross sectional area for containing equipment, while the area of the entrance and exit is each relatively small to control the amount of light that can enter the tunnel. Where angled end wall portions are provided, a structured light source can be mounted on or adjacent the internal surface(s) of the angled end wall portions. This can reduce the likelihood of a driver of the vehicle seeing the structured light image as the vehicle enters the tunnel.

In any embodiment the cameras can comprise area scan cameras such as one or more Hikvisiion (TM) MV-CA050-10GC area scan cameras, line scan cameras, or digital single-lens reflex (DSLR) cameras.

In any embodiment the cameras can be fixed to tunnel and thus the cameras will take the shape of the inside of the tunnel. Alternatively, the cameras can be mounted on dedicated mounting structures.

In use, the vehicle 12 enters the tunnel 16 via the entrance 18 and enters the imaging volume 38 of the tunnel volume. An image defined by the target surface 34 will be reflected via an outer surface of the vehicle 12 to be visible to the camera 30. The color modifier CM will cause the target surface 34 to adopt a specific color depending on the color of the vehicle portion being imaged so as to make the target surface 34 appear the specific color. The color of target surface 34 is provided by the color modifier CM transmitting colored light 32 through the 12 within the imaging volume with the first color and reflect an image of the now colored target surface from the vehicle into the field of view of the camera 30. Therefore, the camera(s) detect the target surface indirectly, via the vehicle 12.

Although the invention has been described above with reference to one or more embodiments, it will be appreciated that various changes or modifications can be made without departing from the scope of the invention as defined in the appended claims. Embodiments of the invention extend to an arrangement having fewer than four scratch detecting cameras, for example a single forward and rear facing camera, and the patterned portion does not need to be between the non-patterned portions. The word "comprising" can mean "including" and therefore does not exclude the presence of elements or steps other than those listed in any claim or the specification as a whole. The mere fact that certain measures are recited in mutually different dependent claims does not indicate that a combination of these measures cannot be used to advantage.

What is claimed is:

1. A vehicle imaging station for capturing images of scratches on a vehicle, the vehicle imaging station comprising:
   a tunnel having an entrance and an exit, with one or more walls defining an enclosure between the entrance and exit to define a tunnel volume containing a vehicle pathway having a central axis;
   a reflection source surface;
   a camera arranged with a field of view comprising an imaging volume of the tunnel volume in which an image defined by the reflection source surface will be reflected to be visible to the camera as a reflected image by a vehicle moving along the vehicle pathway; and
   a color modifier arranged to cause the reflection source surface to adopt a first color of a plurality of possible colors in response to a color control signal such that the reflected image has the first color, wherein the reflection source surface is a panel on or adjacent to the one or more walls.

2. The vehicle imaging station according to claim 1, further comprising a controller arranged to generate and transmit the color control signal to the color modifier in response to vehicle information.

3. The vehicle imaging station according to claim 2, wherein the controller is arranged to access a vehicle color database in response to receiving a vehicle identifier in order to obtain the vehicle information.

4. The vehicle imaging station according to claim 2, wherein the controller is arranged to receive an image of a vehicle and process the image in order to obtain the vehicle information.

5. The vehicle imaging station according to claim 1, wherein the reflection source surface comprises a translucent surface.

6. The vehicle imaging station according to claim 1, wherein the reflection source surface comprises an illuminating surface.

7. The vehicle imaging station according to claim 1, wherein the reflection source surface comprises at least one of a non-illuminating or plain surface.

8. The vehicle imaging station according to claim 1, wherein the reflection source surface is planar or flat.

9. The vehicle imaging station according to claim 1, further comprising a plurality of distinct reflection source surfaces.

10. The vehicle imaging station according to claim 1, further comprising multiple cameras arranged to image the vehicle in the imaging volume.

11. The vehicle imaging station according to claim 1, further comprising a general light source.

12. The vehicle imaging station according to claim 1, wherein the walls are planar or flat and connected by a roof portion which extends orthogonally to the walls.

13. A vehicle imaging station for capturing images of scratches on a vehicle, the vehicle imaging station comprising:
   a tunnel having an entrance and an exit, with one or more walls defining an enclosure between the entrance and exit to define a tunnel volume containing a vehicle pathway having a central axis;
   a reflection source surface;
   a camera arranged with a field of view comprising an imaging volume of the tunnel volume in which an image defined by the reflection source surface will be reflected to be visible to the camera as a reflected image by a vehicle moving along the vehicle pathway; and a color modifier arranged to cause the reflection source surface to adopt a first color of a plurality of possible colors in response to a color control signal such that the reflected image has the first color, wherein the reflection source surface is within the tunnel volume.

14. A vehicle imaging station for capturing images of scratches on a vehicle, the vehicle imaging station comprising:

a tunnel having an entrance and an exit, with one or more walls defining an enclosure between the entrance and exit to define a tunnel volume containing a vehicle pathway having a central axis;

a reflection source surface;

a camera arranged with a field of view comprising an imaging volume of the tunnel volume in which an image defined by the reflection source surface will be reflected to be visible to the camera as a reflected image by a vehicle moving along the vehicle pathway; and a color modifier arranged to cause the reflection source surface to adopt a first color of a plurality of possible colors in response to a color control signal such that the reflected image has the first color, wherein the color control signal is generated based on an analysis of the vehicle color from an image of the vehicle.

15. A vehicle imaging station for capturing images of scratches on a vehicle, the vehicle imaging station comprising:

a tunnel having an entrance and an exit, with one or more walls defining an enclosure between the entrance and exit to define a tunnel volume containing a vehicle pathway having a central axis;

a reflection source surface;

a camera arranged with a field of view comprising an imaging volume of the tunnel volume in which an image defined by the reflection source surface will be reflected to be visible to the camera as a reflected image by a vehicle moving along the vehicle pathway; and a color modifier arranged to cause the reflection source surface to adopt a first color of a plurality of possible colors in response to a color control signal such that the reflected image has the first color, wherein a panel on or adjacent to the one or more walls changes apparent color based on the color of a vehicle.

* * * * *